Dec. 27, 1949  H. R. LEDINGHAM  2,492,587
FISHING REEL
Filed Feb. 16, 1948
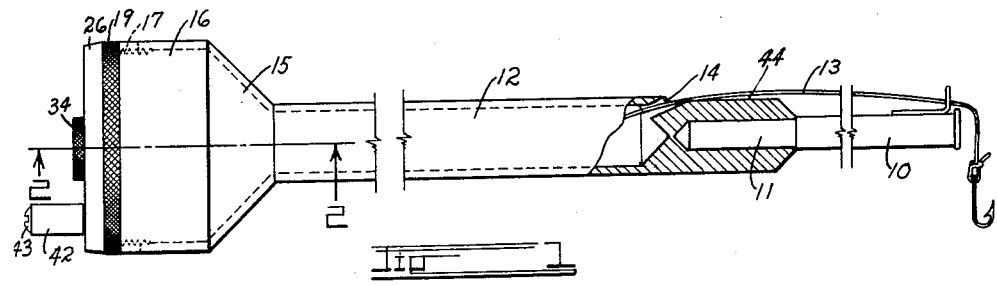
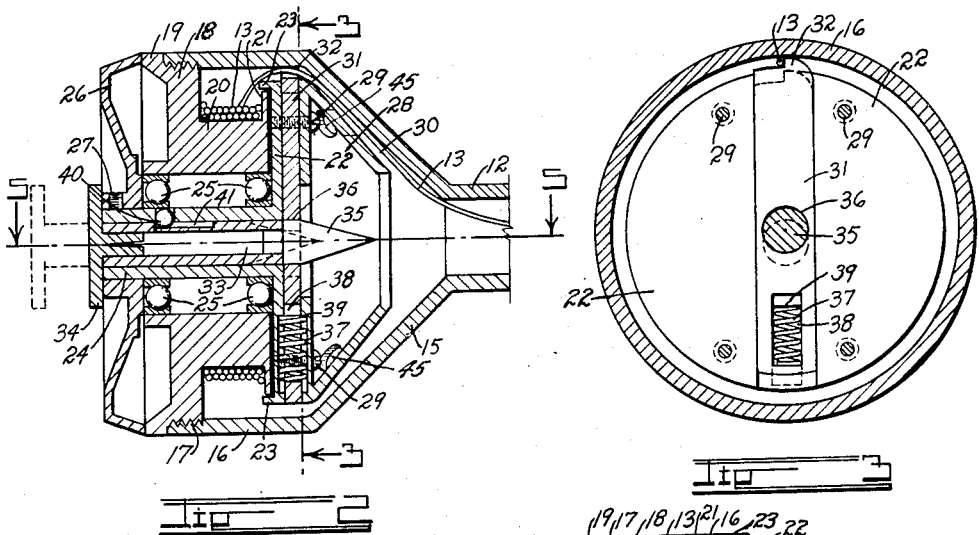
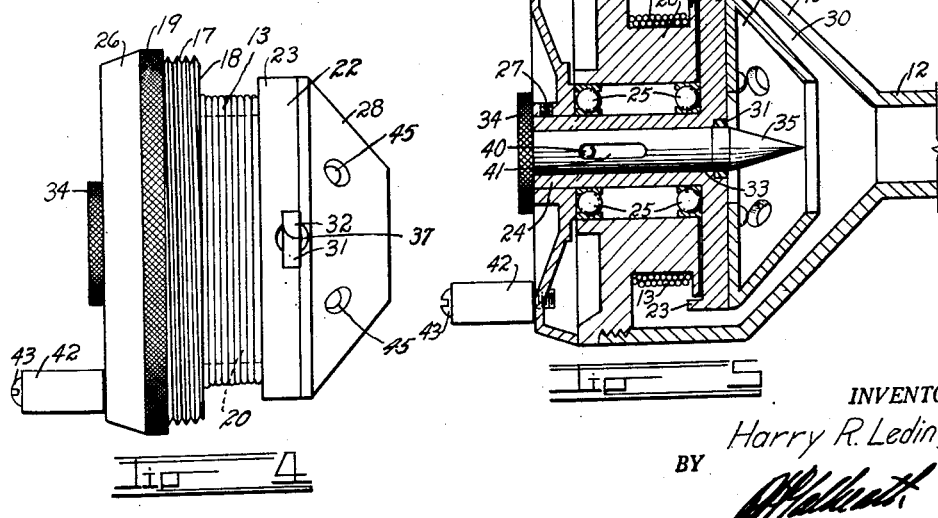
INVENTOR.
Harry R. Ledingham
BY
ATTORNEY Patented Dec. 27, 1949

2,492,587

UNITED STATES PATENT OFFICE 2,492,587

FISHING REEL

Harry R. Ledingham, Denver, Colo.

Application February 16, 1948, Serial No. 8,520

6 Claims. (Cl. 43—20)

This invention relates to a fish line reel for use with fishing rods, and has for its principal object the provision of a neat and highly efficient reeling device which will allow the line to be easily and rapidly withdrawn without rotation of the reel, and which will enable the withdrawn line to be quickly and easily wound back upon the reel.

Another object of the invention is to so construct the reel that it may be slipped onto the rear extremity of a conventional fishing rod to provide a handle therefor and to so position the reel with respect to the handle that it will act as a counter-balance for the pole, and to provide a reel in which all sidewardly extending parts will be eliminated so that the pole may be passed through underbrush without catching thereon.

A further object is to so construct the reel that the line will not be entangled should the reel be rotated in the wrong direction, and to provide means whereby the operator may control the tension in the line either by direct thumb contact or by frictional engagement with a rotating member on the reel.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

In the drawing:

Fig. 1 is a side elevation of the improved reel;

Fig. 2 is a longitudinal section through the reeling portion of the device, taken on the line 2—2, Fig. 1;

Fig. 3 is a cross-section, taken on the line 3—3, Fig. 2;

Fig. 4 is a side view of the inner core of the reel removed from the outer housing; and Fig. 5 is a longitudinal section, taken on the line 5—5, Fig. 2.

In Fig. 1 a portion of a conventional fishing rod is indicated at 10, with its rearmost ferrule at 11 and line at 13.

The improved reel is designed for attachment to the ferrule 11 so as to be axially aligned therewith, and comprises a handle portion 12 having a socket in its forward extremity for receiving the ferrule 11. The handle may, if desired, be covered with any of the usual handle materials such as cork or tape. The remainder of the handle portion 12 is hollow for the passage of the fish line 13 which extends from the hollow interior through an inclined line opening 14 adjacent the forward extremity of the handle portion.

The rear extremity of the handle portion 12 is flared outwardly to form a cone of substantially 45°, as indicated at 15, thence continues rearwardly to form a cylindrical housing 16. The rear extremity of the housing 16 is internally threaded to receive external threads 17 formed on a reel plate 18 having a cap flange 19 which seals the housing 16. The cap flange is preferably knurled, as shown in Fig. 1, so that it may be rotated into or out of the housing 16 by hand.

The reel plate 18 carries a cylindrical line reel 20 extending forwardly therefrom into the housing 16 which terminates in a side flange 21. The line 13 is coiled about the reel 21 between the reel plate 18 and the side flange 21. A circular winding disc 22 is positioned forwardly of the reel 20 and provided with a peripheral flange 23 which extends rearwardly to enclose the side flange 21.

The winding disc 22 is mounted or formed on a hollow, rotatable, cylindrical trunnion 24 which extends rearwardly through the reel 20 and is mounted in suitable anti-friction bearings 25. A circular cap 26 having a smooth beveled periphery is mounted on the rearward extremity of the trunnion 24 and locked thereon by means of a suitable set screw 27, or in any other desired manner. The cap 26 closes and seals the rearward face of the reel plate 18. The cap 26 carries an eccentrically positioned crank 42 rotatably mounted on a crank pin 43 threaded into the cap 26.

A hollow line guiding cone 28 is secured concentrically to the front face of the winding disc 22 by means of suitable attachment screws 29. The line guiding cone 28 fits into the cone 15 and is slightly smaller than the latter so that a conical, wedge-shaped, line passage 30 is formed entirely about the line guiding cone 28. Screw driver passages 45 are formed in the cone 28 to allow access to the screws 29.

A line winding bar 31 is slidably mounted in a groove of corresponding shape extending diametrically across the face of the winding disc 22. The winding bar 31 is held in place in its groove by means of the overlying line guiding cone 28. One extremity of the bar 31 is provided with a rounded line engaging tooth 32 which can be moved outwardly into close proximity or engagement with the inner wall of the housing 16 and which can be withdrawn to move the tooth below the periphery of the winding disc 22 as indicated by the dotted line position of Fig. 3.

The winding bar is moved outwardly to the line engaging position by means of a wedge pin 33 which extends throughout the length of the trunnion 24 and terminates at the rear in a finger button 34. The forward extremity of the wedge pin carries a conical point 35 which extends into a round receiving opening 36 in the bar 31. The receiving opening 36 is so positioned that when the larger diameter of the wedge point 35 is in place therein, the winding tooth 32 will be in the projected, solid line position of Fig. 3.

When the wedge point 35 is drawn rearwardly, as indicated by broken line in Fig. 2, the bar 31 may slide down upon the conical surface of the point 35 to allow the winding point 32 to withdraw from the line. The bar 31 is constantly urged toward the withdrawn position by means of a compression spring 37 which is positioned in a spring opening 38 adjacent one extremity of the bar 31, and which bears against the bottom of the opening 38 and shoulders 39 formed in the back of the guiding cone 28 and the front of the line reel 20.

The outward and inward movement of the wedge member 33 is limited by means of a stop ball 40 positioned in a ball opening in the trunnion 24 and riding in a groove 41 in the wedge member 33.

To reel in the line 13, the wedge pin 33 is pressed forwardly to the solid line position of Fig. 2. This causes the wedging action of the point 35 to force the bar 31 radially outward to the solid line position of Fig. 3. The crank 42 is then rotated to the right. This causes the tooth 32 to engage the line, which is passing from the handle 12 through the line passage 30 to the reel 21. Rotation of the crank causes the tooth 32 to wind the line around the stationary reel 20.

The line can be released for casting purposes by simply withdrawing the button 34 to the broken line position of Fig. 2. This allows the spring 37 to withdraw the tooth 32 out of contact with the line. The line can then freely spin around the conical passage 30, unwinding itself from the reel 20.

There is no resistance to the unwinding, as there are no parts moving, so that exceedingly long casts may be made with light-weight bait. The outward movement of the line may be controlled by the operator's thumb, which is positioned to press the line into frictional engagement with a flat surface 44 on the handle 12.

The line can be withdrawn from the reel without withdrawing the button 34, in which case the pressure of the line against the tooth 32 rotates the winding disc 22 rearwardly in the bearings 25. This rearward rotation can be resisted by placing the hand or a thumb against the outer beveled surface of the cap 26 to resist rotation thereof.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:

1. A line reel for fishing rods comprising: an elongated handle portion having a socket in one extremity for receiving the pole, said handle being hollow for the passage of the fishing line; a reel housing on the other extremity of said handle portion in axial alignment therewith; a reel support secured in the rearward extremity of said housing; a stationary reel formed on said support and projecting forwardly therefrom in axial alignment with said housing; a winding disc positioned concentrically and forwardly of said reel; a shaft supporting said disc and extending rearwardly and rotatably through said reel; a line winding bar extending diametrically across said winding disc and being slidably mounted therein so that one extremity thereof may be projected beyond the periphery of said winding disc to engage the line and wrap the latter around said reel; and means on the rear extremity of said shaft for rotating said disc.

2. A line reel for fishing rods comprising: an elongated handle portion having a socket in one extremity for receiving the pole, said handle being hollow for the passage of the fishing line; a reel housing on the other extremity of said handle portion in axial alignment therewith; a reel support secured in the rearward extremity of said housing; a stationary reel formed on said support and projecting forwardly therefrom in axial alignment with said housing; a winding disc positioned concentrically and forwardly of said reel; a shaft supporting said disc and extending rearwardly and rotatably through said reel; a line winding bar extending diametrically across said winding disc and being slidably mounted therein so that one extremity thereof may be projected beyond the periphery of said winding disc to engage the line and wrap the latter around said reel; a pointed wedge member axially slidable within said shaft, the point of said wedge member being adapted to project through an opening in said winding bar to hold the latter in the projected position and in engagement with the line; and means for rotating said shaft from the exterior of said housing.

3. A line reel for fishing rods comprising: an elongated handle portion having a socket in one extremity for receiving the pole, said handle being hollow for the passage of the fishing line; a reel housing on the other extremity of said handle portion in axial alignment therewith; a reel support secured in the rearward extremity of said housing; a stationary reel formed on said support and projecting forwardly therefrom in axial alignment with said housing; a winding disc positioned concentrically and forwardly of said reel; a shaft supporting said disc and extending rearwardly and rotatably through said reel; a line winding bar extending diametrically across said winding disc and being slidably mounted therein so that one extremity thereof may be projected beyond the periphery of said winding disc to engage the line and wrap the latter around said reel; a pointed wedge member axially slidable within said shaft, the point of said wedge member being adapted to project through an opening in said winding bar to hold the latter in the projected position and in engagement with the line; means for rotating said shaft from the exterior of said housing; and a spring acting against said winding bar to withdraw the latter when said wedge member is withdrawn from said opening.

4. A line reel for fishing rods comprising: an elongated handle portion having a socket in one extremity for receiving the pole; said handle being hollow for the passage of the fishing line; a reel housing on the other extremity of said handle portion in axial alignment therewith; a reel support secured in the rearward extremity of said housing; a stationary reel formed on said support and projecting forwardly therefrom in axial alignment with said housing; a winding disc positioned concentrically and forwardly of said reel; a shaft supporting said disc and extending rearwardly and rotatably through said reel; a line winding bar extending diametrically across said winding disc and being slidably mounted therein so that one extremity thereof may be projected beyond the periphery of said winding disc to engage the line and wrap the latter around said reel; a pointed wedge member axially slidable within said shaft, the point of said wedge member being adapted to project through an opening in said winding bar to hold the latter in the projected position and in engagement with the line; means for rotating said shaft from the exterior of said housing; a spring acting against said winding bar to withdraw the latter when said wedge member is withdrawn from said opening; and a line guiding cone secured on the forward face of said winding disc over said winding bar to guide the line around the periphery of said winding disc.

5. A line reel for fishing rods comprising: an elongated handle portion having a socket in one extremity for receiving the pole, said handle being hollow for the passage of the fishing line; a reel housing on the other extremity of said handle portion in axial alignment therewith; a reel support secured in the rearward extremity of said housing; a stationary reel formed on said support and projecting forwardly therefrom in axial alignment with said housing; a winding disc positioned concentrically and forwardly of said reel; a shaft supporting said disc and extending rearwardly and rotatably through said reel; a line winding bar extending diametrically across said winding disc and being slidably mounted therein so that one extremity thereof may be projected beyond the periphery of said winding disc to engage the line and wrap the latter around said reel; a cap disc secured on the rearward extremity of said shaft and closing the rearward extremity of said housing; and a crank handle projecting eccentrically from said crank disc for rotating said winding disc.

6. A line reel for fishing rods comprising: an elongated handle portion having a socket in one extremity for receiving the pole, said handle being hollow for the passage of the fishing line; a reel housing on the other extremity of said handle portion in axial alignment therewith; a reel support secured in the rearward extremity of said housing; a stationary reel formed on said support and projecting forwardly therefrom in axial alignment with said housing; a winding disc positioned concentrically and forwardly of said reel; a shaft supporting said disc and extending rearwardly and rotatably through said reel; a line winding bar extending diametrically across said winding disc and being slidably mounted therein so that one extremity thereof may be projected beyond the periphery of said winding disc to engage the line and wrap the latter around said reel; a pointed wedge member axially slidable within said shaft, the point of said wedge member being adapted to project through an opening in said winding bar to hold the latter in the projected position and in engagement with the line; means for rotating said shaft from the exterior of said housing; and a finger button on the rearward extremity of said wedge member to facilitate its withdrawal from said winding bar.

HARRY R. LEDINGHAM.

REFERENCES CITED

The following references are of record in the file of this patent:

UNITED STATES PATENTS

| Number | Name | Date |
|---|---|---|
| 2,299,156 | Lind | Oct. 20, 1942 |

FOREIGN PATENTS

| Number | Country | Date |
|---|---|---|
| 22,597 | Great Britain | 1907 |
| 909,825 | France | Jan. 7, 1946 |